United States Patent
Swiler et al.

(10) Patent No.: US 8,806,896 B2
(45) Date of Patent: Aug. 19, 2014

(54) PROCESS FOR MELTING AND REFINING SILICA-BASED GLASS

(71) Applicant: Owens-Brockway Glass Container Inc., Perrysburg, OH (US)

(72) Inventors: Daniel Russell Swiler, Maumee, OH (US); Terence John Clark, Sanford, MI (US); Carl Lucas Fayerweather, Maumee, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 0 days.

(21) Appl. No.: 13/653,992

(22) Filed: Oct. 17, 2012

(65) Prior Publication Data

US 2014/0102147 A1    Apr. 17, 2014

(51) Int. Cl.
    *C03B 5/225*    (2006.01)
(52) U.S. Cl.
    USPC .................................... 65/134.1
(58) Field of Classification Search
    USPC ............................... 65/134.1
    See application file for complete search history.

(56) References Cited

U.S. PATENT DOCUMENTS

| | | | |
|---|---|---|---|
| 3,445,255 A * | 5/1969 | Monks, Jr. | 501/70 |
| 3,532,483 A | 10/1970 | Cardot | |
| 3,573,887 A | 4/1971 | Mod et al. | |
| 3,753,743 A | 8/1973 | Kakuda et al. | |
| 3,967,943 A | 7/1976 | Seeley | |
| 4,325,724 A * | 4/1982 | Froberg | 65/474 |
| 4,539,030 A | 9/1985 | Demarest, Jr. et al. | |
| 4,920,080 A | 4/1990 | Demarest, Jr. | |
| 5,004,706 A | 4/1991 | Dickinson | |
| 5,028,248 A * | 7/1991 | Williams et al. | 65/134.7 |
| 6,883,349 B1 | 4/2005 | Jeanvoine | |
| 2004/0050106 A1* | 3/2004 | Murnane | 65/134.3 |
| 2004/0224833 A1* | 11/2004 | Jeanvoine et al. | 501/70 |

* cited by examiner

*Primary Examiner* — Joseph S Del Sole
*Assistant Examiner* — Russell Kemmerle, III

(57) ABSTRACT

A process for making silica-based glass includes: (a) forming a glass precursor melt that includes glass network formers and glass network modifiers, the glass precursor melt having a viscosity of not more than 30 Pa·s at 1300 C., and (b) refining the glass precursor melt. Either or both steps (a) and (b) can include stirring and/or be carried out under reduced pressure to enhance refining. The refined glass precursor melt preferably is mixed with additional materials including silica ($SiO_2$) to form a silica-based glass melt.

26 Claims, 2 Drawing Sheets

PROCESS FOR MELTING AND REFINING SILICA-BASED GLASS

The present disclosure relates to a process for melting and refining silica-based glass, and particularly to such a process that employs a "precursor" glass as an intermediate product.

BACKGROUND AND SUMMARY OF THE DISCLOSURE

Silica-based glass, such as soda-lime glass, is commonly used in the manufacture of glass containers and other products. During the melting process, raw materials typically are mixed and then fed into a glass melter. The glass typically has a residence time in a furnace on the order of twenty-four hours to refine the glass by driving off gases as the raw materials decompose to oxide forms and melting the oxides to provide a homogenous glass melt. One of the rate-limiting steps in this process is called "refining," sometimes referred to as "fining," which is the process of removal of gas bubbles from the glass melt. If not removed, these bubbles can remain in the finished object, and can be objectionable for reasons including strength and aesthetics. In addition to being undesirably slow, this in-furnace refining process involves a large amount of space and high energy input.

A general object of the present disclosure is to provide a process for making silica based glass, which is more rapid and requires less energy input than conventional processes.

The present disclosure embodies a number of aspects that can be implemented separately from or in combination with each other.

A process for making a silica-based glass, in accordance with one aspect of the present disclosure, includes: (a) reacting at least one glass network former and at least one glass network modifier to form a glass precursor melt, the glass precursor melt having a viscosity of not more than 30 Pa·s, preferably less than 15 Pa·s and most preferably less than 8 Pa·s, when measured at a temperature of 1300 C. by an Orton RSV-1600 viscometer using an Orton part number 13-1500 spindle, and (b) refining the glass precursor melt. Other viscosity measuring techniques can be employed.

Either or both steps (a) and (b) can be carried out under reduced pressure or other method to enhance refining. Additional raw materials can then be added to the refined glass precursor melt to yield the desired glass composition. Typically this composition can have a viscosity above 30 Pa·s when measured at 1300 C. These additions preferably include glass network former materials including silica ($SiO_2$). Cullet, frit and/or minor ingredients such as colorants can be added at this stage.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

Figure 1:
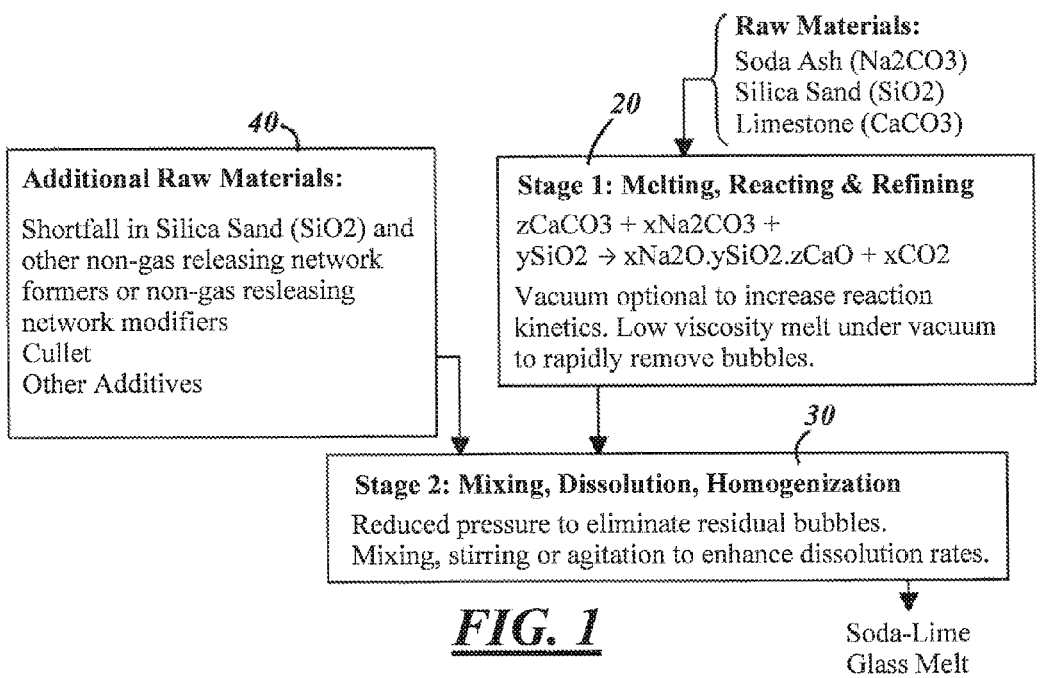
FIG. 1 is a block diagram of a process for reacting, melting and refining silica-based glass in accordance with one exemplary embodiment of the disclosure.

The ASTM defines glass as "an inorganic product of fusion which has been cooled to a rigid condition without crystalizing." Traditional glasses are composed of glass forming oxides (oxides that can form glasses by themselves), intermediate oxides (oxides that can form glasses if mixed with a small amount of other selected oxides), and glass network modifiers (oxides that are difficult to vitrify but are used to modify the structure and properties of a glass composed of glass forming and/or intermediate oxides).

One particular classification (Varshneya) places elements and their oxides into the following categories:
Glass formers: B, Si, Ge, Al, P, V, As, Sb, Zr
Intermediates: Ti, Zn, Pb, Al, Th, Be, Zr, Cd
Modifiers: Sc, La, Y, Sn, Ga, In, Th, Pb, Mg, Li, Zn, Ba, Ca, Sr, Cd, Na, Ce, K, Rb, Hg, Cs.

Among the list given above, the elements most often used as modifiers in commercial glass manufacture are alkalis. The container glass industry traditionally has used silica ($SiO_2$) as the glass forming oxide with varying amounts of sodium and calcium oxides as glass modifiers, and small amounts of intermediates such as aluminum oxides. An appropriately chosen glass composition typically is prepared by the following three steps—(a) batch melting, (b) homogenization (primarily sand dissolution), and (c) refining or bubble removal. The process of refining or removing bubbles, either by dissolving them in the melt or by allowing them to rise to the top of the melt, often is the most time consuming step in the melting operation.

Preferred glass network formers are compounds of Si, Al and B. Glass network formers are preferably in the oxide form. Preferred glass network modifiers are compounds of sodium, lithium and/or potassium, and/or compounds of calcium, magnesium and/or barium. Glass network modifiers and intermediates can be selected from the group consisting of oxide, carbonate, bicarbonate, sulfate, sulfide, hydride, hydroxide, nitrate and/or chloride forms of the recited elements.

In the past, various methods have been explored in an effort to reduce glass refining time; these methods typically required a great deal of energy and were very time consuming. Most methods involve heating the glass melt to temperatures well above the raw material batch melting point, introducing refining agents that either help dissolve the bubbles or increase the size of the bubbles which causes the bubbles to rise to the top of melt quicker, reducing the height (thickness) of the glass melt (during the refining step), and/or increasing the residence time of the glass melt to achieve more thorough refining. Other refining methods have employed vacuum, ultrasonic waves and centrifugal acceleration to assist in bubble removal with limited commercial success.

The present disclosure recognizes that most bubbles in a glass melt are $CO_2$ or $SO_2$ that is released during the dissolution of the raw batch materials and that the refining, or removal of bubbles from a glass melt, is more easily accomplished if the melt has a low viscosity. Network modifiers reduce the viscosity of a glass melt so that the bubbles can rise to the top of the melt more quickly. Therefore, in this disclosure, most, if not all, of the raw materials that evolve gasses preferably are added to the low viscosity glass precursor melt to achieve more thorough and faster refining, prior to adding the remaining glass network forming materials to produce the final glass melt composition. The glass precursor melt preferably is a melt formulated to have a viscosity less than 30 Pa·s. Traditional raw materials such as soda ash ($Na_2CO_3$) and calcium carbonate ($CaCO_3$) release primarily carbon dioxide, and should be for the most part added prior to refining of the precursor melt. In addition, it should be noted that a wide variety of gas releasing raw materials may be advantageously added into the precursor melt. These compounds may include sulfates, sulfides, hydrates, hydroxides, chlorides, nitrates and nitride compounds of desired metals.

FIG. 1 illustrates a process for making silica-based glass in accordance with one exemplary embodiment of the present disclosure. A first stage 20 of the process involves melting, reacting and refining input materials and production of a low-viscosity sodium-calcium-silicate ($Na_2O.SiO_2.CaO$) glass precursor by melting, reacting and refining substantially all of the desired network modifiers and not all of the silica ($SiO_2$) required for the final glass formulation. This reaction produces a silicate glass precursor. Stage 20 may be carried out under reduced pressure (vacuum) to further promote release of gaseous reaction products.

The glass precursor melt of stage 20 is fed to stage 30, which involves mixing, dissolution and homogenization of the product of stage 20 with additional raw network forming materials from stage 40, including the shortfall of silica ($SiO_2$) or alumina ($Al_2O_3$) or boric acid ($B_2O_3$) needed to reach the desired silica or alumina or boron content of the final glass melt formulation. The silicate solution product of stage 20 typically has a silicate content of not more than 60 weight % calculated as oxide. Additional silica is added at stage 30 to reach the desired final glass silica content, typically on the order of 70 oxide weight %. Cullet and/or minor ingredients such as colorants can be added at stage 40. Stage 30 can include stirring and/or other mixing to promote dissolution and homogenization of the final glass melt product.

Figure 2:
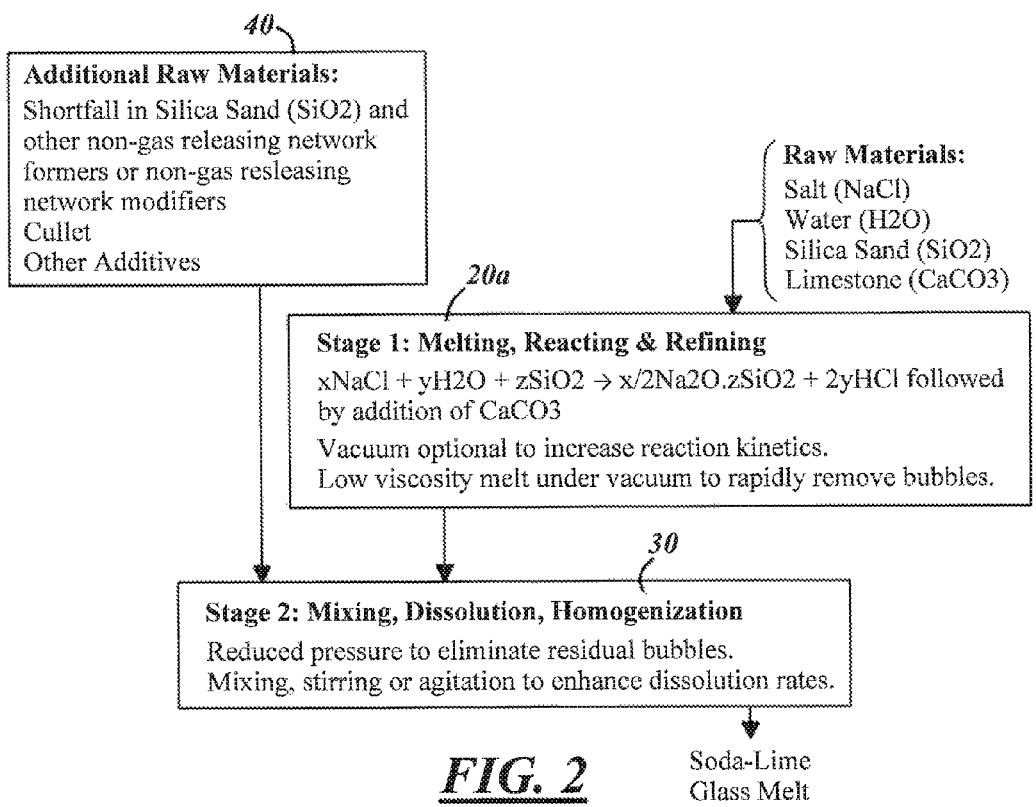
FIG. 2 is a block diagram of a process for reacting, melting and refining silica-based glass in accordance with a second exemplary embodiment of the disclosure.

FIG. 2 illustrates a second embodiment of the process in accordance with the present disclosure. In this process, stage 20a involves melting, reacting and refining salt (NaCl) and silica ($SiO_2$) in the presence of water ($H_2O$, preferably steam) to produce sodium silicate ($Na_2O.SiO_2$) and release hydrogen chloride (HCl) gas. This step is immediately followed by addition of calcium carbonate ($CaCO_3$) such as limestone. The calcium carbonate is rapidly melted, again to produce a low-viscosity sodium-calcium-silicate solution in liquid phase to promote release of gaseous reaction products. Again, stage 20a can be carried out under vacuum further to promote release of gaseous reaction products. Stages 30 and 40 in FIG. 2 are the same as in FIG. 1. The result of either process is a silica-based final glass melt composition.

Stage 20 in FIG. 1 or 20a in FIG. 2 preferably is carried out at a temperature in the range of about 900C. to about 1700C. Stage 30 in FIGS. 1 and 2 preferably is carried out at a temperature greater than about 900C. Most preferably, stage 30 is carried out at a temperature of about 1250C. for not more than 2 hours. The glass network modifiers within the precursor melt preferably have an alkali metal to alkaline metal molar ratio of 1:3 to 3:1. The precursor melt preferably has a network modifier to network former molar ratio of 2:1.5 to 1:2. The sodium-calcium-silicate solution product of stage 20 or 20a preferably has a $Na_2O:CaO:SiO_2$ molar ratio of about 1:1:1.5 to 1:1:4.

There thus has been disclosed a process for making silica-based glass that fully achieves all of the objects and aims previously set forth. The disclosure has been presented in conjunction with presently referred embodiments, and alternatives and modifications have been discussed. Other alternatives and modifications readily will suggest themselves to persons of ordinary skill in the art in view of the foregoing description. The disclosure is intended to embrace all such modifications and variations as fall within the spirit and broad scope of the appended claims.

The invention claimed is:

1. A process for making a silica-based final glass composition, which includes the steps of:

(a) forming a glass precursor melt that includes glass network formers and glass network modifiers, said glass precursor melt having a relatively low viscosity of less than 30Pa·s at a temperature of 1300 C.;
  (b) refining said glass precursor melt; and then
  (c) adding additional glass network formers to said glass precursor melt to form said silica-based final glass composition, wherein said final glass composition has a viscosity of greater than 30Pa·s at a temperature of 1300 C.

2. The process set forth in claim 1 wherein said step (b) is performed under reduced pressure.

3. The process set forth in claim 1 wherein said glass network formers are selected from the group consisting of elements and compounds of Si, Al, B, Ge, P, V, Sb and Zr.

4. The process set forth in claim 3 wherein said glass network formers are selected from the group consisting of oxides and sulfides of the recited elements.

5. The process set forth in claim 1 wherein said glass network modifiers are selected from the group consisting of elements and compounds of Sc, La, Y, Sn, Ga, In, Th, Pb, Mg, Li, Zn, Ba, Ca, Sr, Cd, Na, Ce, K, Rb, Hg and Cs.

6. The process set forth in claim 5 wherein said glass network modifiers are selected from the group consisting of the carbonate, bicarbonate, sulfate, sulfide hydrate, hydroxide, nitrate, oxide and chloride compounds of the recited elements.

7. The process set forth in claim 1 in which substantially all gas-evolving raw materials required to achieve said silica-based final glass composition are added into said glass precursor melt in said step (a).

8. The process set forth in claim 1 wherein said glass network modifiers are selected from the group consisting of elements and compounds of sodium (Na), lithium (Li), potassium (K), calcium (Ca), magnesium (Me), and barium (Ba).

9. The process set forth in claim 8 wherein said glass network modifiers are selected from the group consisting of the carbonate, bicarbonate, sulfate, sulfide hydrate, hydroxide, nitrate, oxide and chloride compounds of the recited elements.

10. The process set forth in claim 1 wherein said glass network modifiers within said glass precursor melt have an alkali metal to alkaline earth metal molar ratio in the range of 1:3 to 3:1.

11. The process set forth in claim 1 wherein a molar ratio of said glass network modifiers to said glass network formers in said glass precursor melt is in the range of 2:1.5 to 1:2.

12. The process set forth in claim 1 wherein said step (c) is carried out at a temperature greater than about 900 C.

13. The process set forth in claim 1 wherein said step (c) is carried out at a temperature of between 1250 C. and 1450 C.

14. The process set forth in claim 1 wherein said step (c) includes stirring.

15. The process set forth in claim 1 wherein said step (c) includes adding cullet to said glass precursor melt.

16. The process set forth in claim 1 wherein said step (c) includes adding silica ($SiO2$) to said glass precursor melt.

17. The process set forth in claim 1 wherein said step (c) includes adding colorants to said glass precursor melt.

18. The process set forth in claim 1 wherein said glass precursor melt has a relatively low viscosity of less than 15Pa·s at a temperature of 1300 C.

19. The process set forth in claim 1 wherein said glass precursor melt has a relatively low viscosity of less than 8Pa·s at a temperature of 1300 C.

20. The process set forth in claim 1 wherein said glass precursor melt has a silica ($SiO2$) content of less than 60 wt. %.

21. The process set forth in claim 1 wherein said silica-based final glass composition has a silica ($SiO_2$) content on the order of 70 wt. %.

22. The process set forth in claim 1 wherein said glass precursor melt is formed in said step (a) by melting, reacting and refining calcium carbonate ($CaCO_3$), soda ash ($Na_2CO_3$), and silica ($SiO_2$).

23. The process set forth in claim 1 wherein said glass precursor melt is formed in said step (a) by:
   (i) melting, reacting and refining sodium chloride (NaCl) and silica ($SiO_2$) in the presence of water ($H_2O$) to produce a sodium silicate solution ($Na_2O.SiO_2$); and then
   (ii) adding calcium carbonate ($CaCO_3$) to said sodium silicate solution.

24. The process set forth in claim 1 wherein substantially all of the glass network modifiers required to achieve said final glass composition are added into said glass precursor melt in said step (a), but only a portion of the glass network formers required to achieve said final glass composition are added into said glass precursor melt in said step (a).

25. The process set forth in claim 24 wherein said step (c) includes adding a remaining portion of the glass network formers required to achieve said final glass composition into said glass precursor melt.

26. The process set forth in claim 1 wherein said glass precursor melt formed in said step (a) is a sodium-calcium-silicate solution ($Na_2O.CaO.SiO_2$) that has a $Na_2O:CaO:SiO_2$ molar ratio in the range of 1:1:1.5 to 1:1:4.

* * * * *